US006594307B1

(12) United States Patent
Beerends

(10) Patent No.: US 6,594,307 B1
(45) Date of Patent: Jul. 15, 2003

(54) DEVICE AND METHOD FOR SIGNAL QUALITY DETERMINATION

(75) Inventor: John Gerard Beerends, The Hague (NL)

(73) Assignee: Koninklijke KPN N.V., Groningen (NL)

( * ) Notice: Subject to any disclaimer, the term of this patent is extended or adjusted under 35 U.S.C. 154(b) by 0 days.

(21) Appl. No.: 09/308,978

(22) PCT Filed: Dec. 13, 1996

(86) PCT No.: PCT/EP96/05589

§ 371 (c)(1),
(2), (4) Date: Aug. 30, 1999

(87) PCT Pub. No.: WO98/26633

PCT Pub. Date: Jun. 18, 1998

(51) Int. Cl.[7] .............................................. H04B 17/00

(52) U.S. Cl. ........................ 375/224; 702/69; 704/205; 704/211; 704/500

(58) Field of Search ................................ 375/224, 228, 375/285, 316, 346; 455/214; 704/200, 201, 205, 211, 226, 500, 501, 502, 503, 504; 702/57, 69, 189

(56) References Cited

U.S. PATENT DOCUMENTS

| | | | | | |
|---|---|---|---|---|---|
| 4,028,627 A | * | 6/1977 | Cho et al. | | 455/214 |
| 4,860,360 A | | 8/1989 | Boggs | | 381/48 |
| 6,041,294 A | * | 3/2000 | Beerends | | 704/203 |
| 6,064,946 A | * | 5/2000 | Beerends | | 702/57 |
| 6,064,966 A | * | 5/2000 | Beerends | | 704/500 |

FOREIGN PATENT DOCUMENTS

| | | | | |
|---|---|---|---|---|
| DE | 3708002 A1 | | 1/1988 | |
| EP | 0 417 739 A2 | | 3/1991 | |
| EP | 0 627 727 A1 | | 12/1994 | |
| EP | 1206104 A1 | * | 5/2002 | H04M/3/32 |
| WO | WO 01/52600 a1 | * | 7/2001 | H04R/29/00 |

OTHER PUBLICATIONS

J.G. Beerends et al, "A Perceptual Speech–Quality Measure Based on a Psychoacoustic Sound Representation", *J. Audio Eng. Soc.,* vol. 42, No. 3, Mar. 1994.

J.G. Beerends et al, "A Perceptual Audio Quality Measure Based on a Psychoacoustic Sound Representation", *J. Audio Eng. Soc.,* vol. 40, No. 12, Dec. 1992.

J.G. Beerends et al, "Modelling a Cognitive Aspect in the Measurement of the Quality of Music Codecs", *Proceedings of the 96th Convention,* Feb. 26 through Mar. 1, 1994, Amsterdam, paper of the Audio Engineering Society.

* cited by examiner

*Primary Examiner*—Stephen Chin
*Assistant Examiner*—Chieh M. Fan
(74) *Attorney, Agent, or Firm*—Michaelson & Wallace; Peter L. Michaelson

(57) ABSTRACT

A device for determining quality of an output signal to be generated by a signal processing circuit, including a radio link, with respect to a reference signal. The device has a first and second series circuits for receiving the output signal and the reference signal, respectively. The device generates an objective quality signal through a combining circuit coupled to the two series circuits, wherein a scaling circuit is disposed between the two series circuits for scaling at least one series circuit signal. A poor correlation between the objective quality signal and a subjective quality signal to be assessed by human observers can be considerably improved by disposing a discounting arrangement inside the combining circuit, and coupling the discounting arrangement to the scaling circuit so as to receive a comparison signal and discount the comparison signal while generating the objective quality signal.

8 Claims, 4 Drawing Sheets

DEVICE AND METHOD FOR SIGNAL QUALITY DETERMINATION

BACKGROUND OF THE INVENTION

1. Field of the Invention

The invention relates to a device for determining the quality of an output signal to be generated by a signal processing circuit with respect to a reference signal, which device is provided with.

- a first signal processing arrangement, coupled to the first signal input of the first series circuit, for generating the a first signal parameter as a function of time and frequency, and
- a first compressing arrangement, coupled to the first signal processing arrangement, for compressing a first signal parameter and for generating a first compressed signal parameter, a second series circuit having a second input for receiving the reference signal, which second series circuit is provided with

- a second compressing arrangement, coupled to the second input, for generating a second compressed signal parameter, a combining circuit, coupled to a first output of the first series circuit and to a second output of the second series circuit, for generating a quality signal, which combining circuit is provided with

- a differential arrangement, coupled to the two compressing arrangements, for determining a differential signal on the basis of the compressed signal parameters, and
- an integrating arrangement, coupled to the differential arrangement, for generating the quality signal by integrating the differential signal with respect to time and frequency, a scaling circuit which is situated between inputs of both compressing arrangements, which scaling circuit is provided with

- a further integrating arrangement for integrating a first series circuit signal and a second series circuit signal with respect to frequency, and
- a comparing arrangement, coupled to the further integrating arrangement, for comparing the two integrated series circuit signals and for scaling at least one series circuit signal in response to the comparison.

2. Description of the Prior Art

Such devices are disclosed in WO 96/28953, WO 96/28952 and WO 96/28950, which international patent applications define inventions for improving a known device disclosed in J. Audio Eng. Soc., Vol. 40, No. 12, December 1992, in particular "A Perceptual Audio Quality Measure Based on a Psychoacoustic Sound Representation" by John G. Beerends and Jan A. Stemerdink, pages 963–978 (hereinafter "the Beerends et al paper"), more particularly FIG. 7. The device described in WO 96/28953 determines the quality of an output signal to be generated by a signal processing circuit, such as, for example, a coder/decoder, or codec, with respect to a reference signal. The reference signal is, for example, an input signal to be presented to the signal processing circuit, although the possibilities also include using, as the reference signal, a pre-calculated ideal version of the output signal. The first signal parameter is generated as a function of time and frequency by means of the first signal processing arrangement, associated with the first series circuit, in response to the output signal, after which the first signal parameter is compressed by means of the first compressing arrangement associated with the first series circuit. In this connection, intermediate operational processing of said first signal parameter should not be ruled out at all. The second signal parameter is compressed by means of the second compressing arrangement associated with the second series circuit in response to the reference signal. In this connection, too, further operational processing of said second signal parameter should not be ruled out at all. Of both compressed signal parameters the differential signal is determined by means of the differential arrangement associated with the combining circuit, after which the quality signal is generated by integrating the differential signal with respect to time and frequency by means of the integrating arrangement associated with the combining circuit. This known device is improved by adding the scaling circuit to it. Due to this scaling circuit, the objective quality signal to be assessed by means of said improved device and a subjective quality signal to be assessed by human observers have a good correlation.

However, such a device has, inter alia, the disadvantage that in case the signal processing circuit comprises a radio link, the objective quality signal to be assessed by means of said device and a subjective quality signal to be assessed by human observers have a poor correlation.

SUMMARY OF THE INVENTION

The object of the invention is, inter alia, to provide a device of the type mentioned in the preamble, the objective quality signal to be assessed by means of said device and a subjective quality signal to be assessed by human observers having a better correlation.

For this purpose, the device according to the invention has the characteristic that the device comprises a discounting arrangement situated between the comparing arrangement and the integrating arrangement for discounting the comparison at the integrating arrangement.

As a result of providing the device with the discounting arrangement, in particular large amplitude differences present between both series circuit signals can be discounted at the integrating arrangement. Due to said discounting, a good correlation is obtained between the objective quality signal to be assessed by means of said device and a subjective quality signal to be assessed by human observers, even when the signal of which the quality has to be determined is transported via a radio link.

The invention is based, inter alia, on the insight that the poor correlation between objective quality signals to be assessed by means of known devices and subjective quality signals to be assessed by human observers could also be the consequence, inter alia, of the fact that in particular large amplitude differences present between both series circuit signals imply a bad quality.

The problem of the poor correlation is thus solved by using the discounting arrangement coupled to the scaling circuit.

It should be noted that the device of the present invention will also improve the correlation in case the signal processing circuit comprises an ATM link and in case the signal processing circuit generates signals which differ a lot from signals originating from or belonging to the reference signal.

A first embodiment of the device according to the invention has the characteristic that the scaling circuit is provided with a scaling unit comprising
- an input coupled to an output of the first signal processing arrangement,
- an output coupled to an input of the first compressing arrangement, and
- a control input coupled to an output of the comparing arrangement for scaling the first series circuit signal in response to the comparison.

As a result of providing the scaling circuit with the scaling unit for scaling the first series circuit signal, the scaling circuit functions best. As a result, the correlation is improved still further.

A second embodiment of the device according to the invention has the characteristic that the integrating arrangement comprises an integrator for integrating the differential signal with respect to frequency, and a time averaging arrangement for generating the quality signal by integrating the integrated differential signal with respect to time, the discounting arrangement comprising
- a processing arrangement for processing a comparison signal originating from the comparing arrangement, and
- a multiplying arrangement comprising
  - a first input coupled to an output of the processing arrangement,
  - a second input coupled to an output of the integrator, and
  - an output coupled to an input of the time-averaging arrangement.

By providing the discounting arrangement with the processing arrangement and with the multiplying arrangement, the latter being situated between the integrator and the time-averaging arrangement, the discounting arrangement is coupled to the integrating arrangement in a most efficient way.

A third embodiment of the device according to the invention has the characteristic that the processing arrangement raises the comparison signal to the power p, where $0<p<1$.

In this connection, large amplitude differences are rescaled in dependence of a relationship between both series circuit signals.

A fourth embodiment of the device according to the invention.has the characteristic that the second series circuit is furthermore provided with a second signal processing arrangement, coupled to the second input, for generating a second signal parameter as a function of both time and frequency, the second compressing arrangement being coupled to the second signal processing arrangement in order to compress the second signal parameter.

The invention furthermore relates to a method for determining the quality of an output signal to be generated by a signal processing circuit with respect to a reference signal, which method comprises the following steps of generating a first signal parameter as a function of time and frequency in response to the output signal, integrating, with respect to frequency, a first signal parameter and a second signal parameter, comparing the integrated first and second signal parameters, scaling at least one of the first and second signal parameters in response to a comparison signal, compressing a first signal parameter and a second signal parameter, determining a differential signal on the basis of the compressed signal parameters, and generating a quality signal by integrating the differential signal with respect to frequency and time.

The method according to the invention has the characteristic that the method furthermore comprises the step of discounting the comparison signal at the integrating of the differential signal with respect to frequency and time.

A first embodiment of the method according to the invention has the characteristic that the method comprises the step of scaling the first signal parameter in response to the comparison.

A second embodiment of the method according to the invention has the characteristic that the method comprises the following steps of processing the comparison signal, integrating the differential signal with respect to frequency, multiplying the integrated differential signal with the processed comparison signal for generating a resulting signal, and integrating the resulting signal with respect to time.

A third embodiment of the method according to the invention has the characteristic that the step of processing the comparison signal comprises the step of raising the comparison signal to the power p, where $0<p<1$.

A fourth embodiment of the method according to the invention has the characteristic that the method comprises the step of generating the second signal parameter as a function of both time and frequency in response to the reference signal.

REFERENCES

WO 96/28953

WO 96/28950

WO 96/28952

J. Audio Eng. Soc., Vol. 40, No. 12, December 1992, in particular, "A Perceptual Audio Quality Measure Based on a Psychoacoustic Sound Representation" by John G. Beerends and Jan A. Stemerdink, pages 963–978

"Modelling a Cognitive Aspect in the Measurement of the Quality of Music Codecs", by John G. Beerends and Jan A. Stemerdink, presented at the 96th Convention Feb. 26–Mar. 1, 1994, Amsterdam All the references including the literature cited in these references are deemed to be incorporated in this patent application.

BRIEF DESCRIPTION OF THE DRAWINGS

The invention will be explained in greater detail by reference to an exemplary embodiment shown in the figures. In the figure.

DETAILED DESCRIPTION

Figure 1:
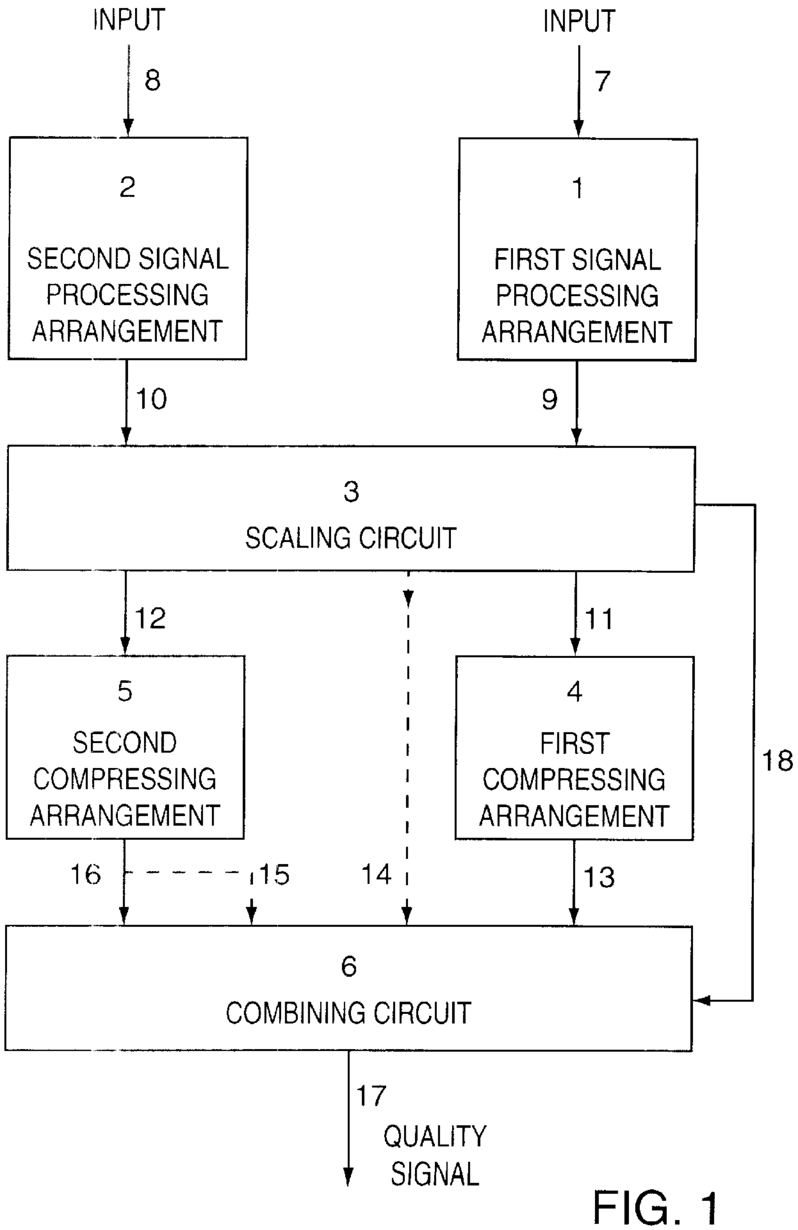
FIG. 1 shows a device according to the invention, comprising known signal processing arrangements, known compressing arrangements, a scaling circuit according to the invention and a combining circuit according to the invention.

The device according to the invention shown in FIG. 1 comprises a first signal processing arrangement 1 having a first input 7 for receiving an output signal originating from a signal processing circuit such as, for example, a coder/decoder, or codec. A first output of first signal processing arrangement 1 is connected via a coupling 9 to a first input of a scaling circuit 3. The device according to the invention furthermore comprises a second signal processing arrangement 2 having a second input 8 for receiving an input signal to be fed to the signal processing circuit such as, for example, the coder/decoder, or codec. A second output of second signal processing arrangement 2 is connected via a coupling 10 to a second input of scaling circuit 3. A first output of scaling circuit 3 is connected via a coupling 11 to a first input of a first compressing arrangement 4, and a second output of scaling circuit 3 is connected via a coupling 12 to a second input of a second compressing arrangement 5. A first output of first compressing arrangement 4 is connected via a coupling 13 to a first input of a combining circuit 6, and a second output of second compressing arrangement 5 is connected via a coupling 16 to a second input of combining circuit 6. A third output of scaling circuit 3 is connected via a coupling 14 to a third input of combining circuit 6, and the second output of second compressing arrangement 5, or coupling 16, is connected via a coupling 15 to a fourth input of combining circuit 6 which has an output 17 for generating a quality signal. A fourth output of scaling circuit 3 is connected via a coupling 18 to a fifth input of combining circuit 6. First signal processing arrangement 1 and first compressing arrangement 4 jointly correspond to a first series circuit, and second signal processing arrangement 2 and second compressing arrangement 5 jointly correspond to a second series circuit.

Figure 2:
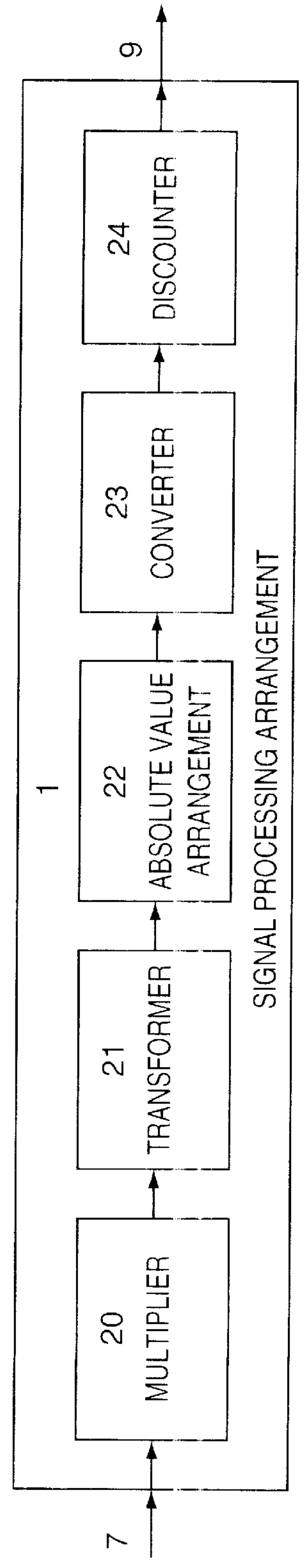
FIG. 2 shows a known signal processing arrangement for use in the device according to the invention.

The known first (or second) signal processing arrangement 1 (or 2) shown in FIG. 2 comprises a first (or second) multiplier 20 for multiplying in the time domain the output signal (or input signal) to be fed to the first input 7 (or second input 8) of the first (or second) signal processing arrangement 1 (or 2) and originating from the signal processing circuit such as, for example, the coder/decoder, or codec, by a window function, a first (or second) transformer 21, coupled to the first (or second) multiplier 20, for transforming the signal originating from the first (or second) multiplier 20 to the frequency domain, a first (or second) absolute-value arrangement 22 for determining the absolute value of the signal originating from the first (or second) transformer 21 for generating a first (or second) positive signal parameter as a function of time and frequency, a first (or second) converter 23 for converting the first (or second) positive signal parameter originating from the first (or second) absolute-value arrangement 22 and represented by means of a time spectrum and a frequency spectrum into a first (or second) signal parameter represented by means of a time spectrum and a Bark spectrum, and a first (or second) discounter 24 for discounting a hearing function in the case of the first (or second) signal parameter originating from the first (or second) converter and represented by means of a time spectrum and a Bark spectrum, which signal parameter is then transmitted via the coupling 9 (or 10).

Figure 3:
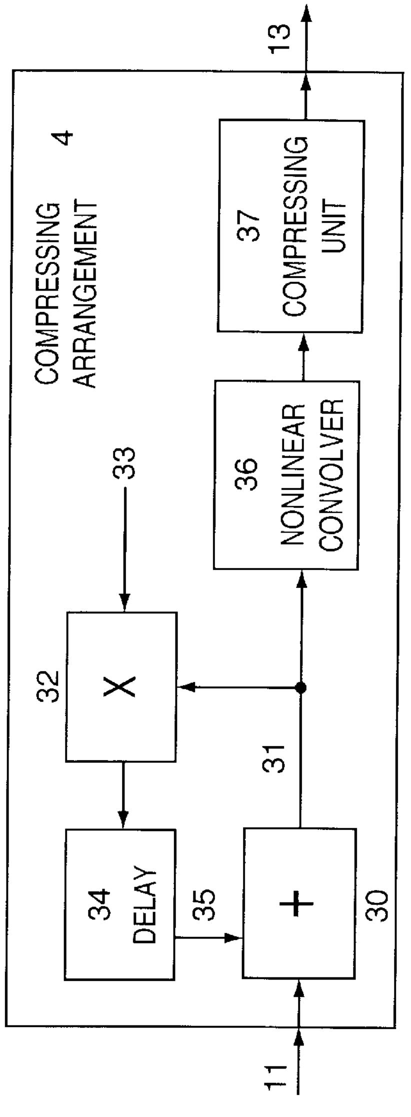
FIG. 3 shows a known compressing arrangement for use in the device according to the invention.

The known first (or second) compressing arrangement 4 (or 5) shown in FIG. 3 receives via coupling 11 (or 12) a signal parameter which is fed to a first (or second) input of a first (or second) adder 30, a first (or second) output of which is connected via a coupling 31, on the one hand, to a first (or second) input of a third (or fourth) multiplier 32 and, on the other hand, to a first (or second) nonlinear convoluting arrangement 36 which is furthermore connected to a first (or second) compressing unit 37 for generating via coupling 13 (or 16) a first (or second) compressed signal parameter. Third (or fourth) multiplier 32 has a further first (or second) input for receiving a feed signal and has a first (or second) output which is connected to a first (or second) input of a first (or second) delay arrangement 34, a first (or second) output of which is coupled to a further first (or second) input of the first (or second) adder 30.

Figure 4:
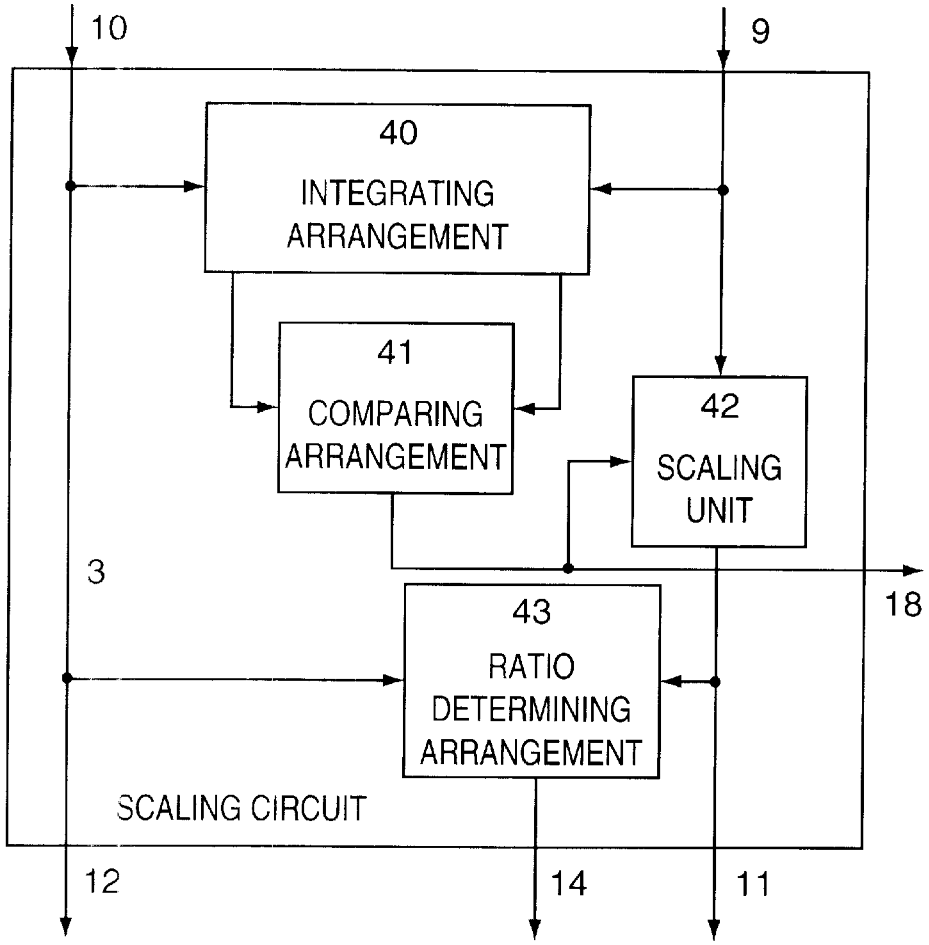
FIG. 4 shows a scaling circuit according to the invention for use in the device according to the invention.

The scaling circuit 3 shown in FIG. 4 comprises a further integrating arrangement 40, a first input of which is connected to the first input of scaling circuit 3 and consequently to coupling 9 for receiving a first series circuit signal (the first signal parameter represented by means of a time spectrum and a Bark spectrum) and a second input of which is connected to the second input of scaling circuit 3 and consequently to coupling 10 for receiving a second series circuit signal (the second signal parameter represented by means of a time spectrum and a Bark spectrum). A first output of further integrating arrangement 40 for generating the integrated first series circuit signal is connected to a first input of a comparing arrangement 41 and a second output of further integrating arrangement 40 for generating the integrated second series circuit signal is connected to a second input of comparing arrangement 41. The first input of scaling circuit 3 is connected to a first input of a scaling unit 42 and a second output is connected to an output of scaling unit 42 and, via scaling circuit 3, coupling 9 is consequently connected through to coupling 11 via scaling unit 42. The second input of scaling circuit 3 is connected to the second output and, via scaling circuit 3, coupling 10 is consequently connected through to coupling 12. An output of comparing arrangement 41 for generating a comparison signal is connected to a control input of scaling unit 42 and to the coupling 18 via the fourth output of scaling circuit 3. The output of scaling unit 42, or coupling 11, is connected to a first input of a ratio-determining arrangement 43, and the second input of scaling circuit 3, or coupling 10 or coupling 12, is connected to a second input of ratio-determining arrangement 43, an output of which is connected to the third output of scaling circuit 3 and consequently to coupling 14 for generating a scaling signal.

Figure 5:
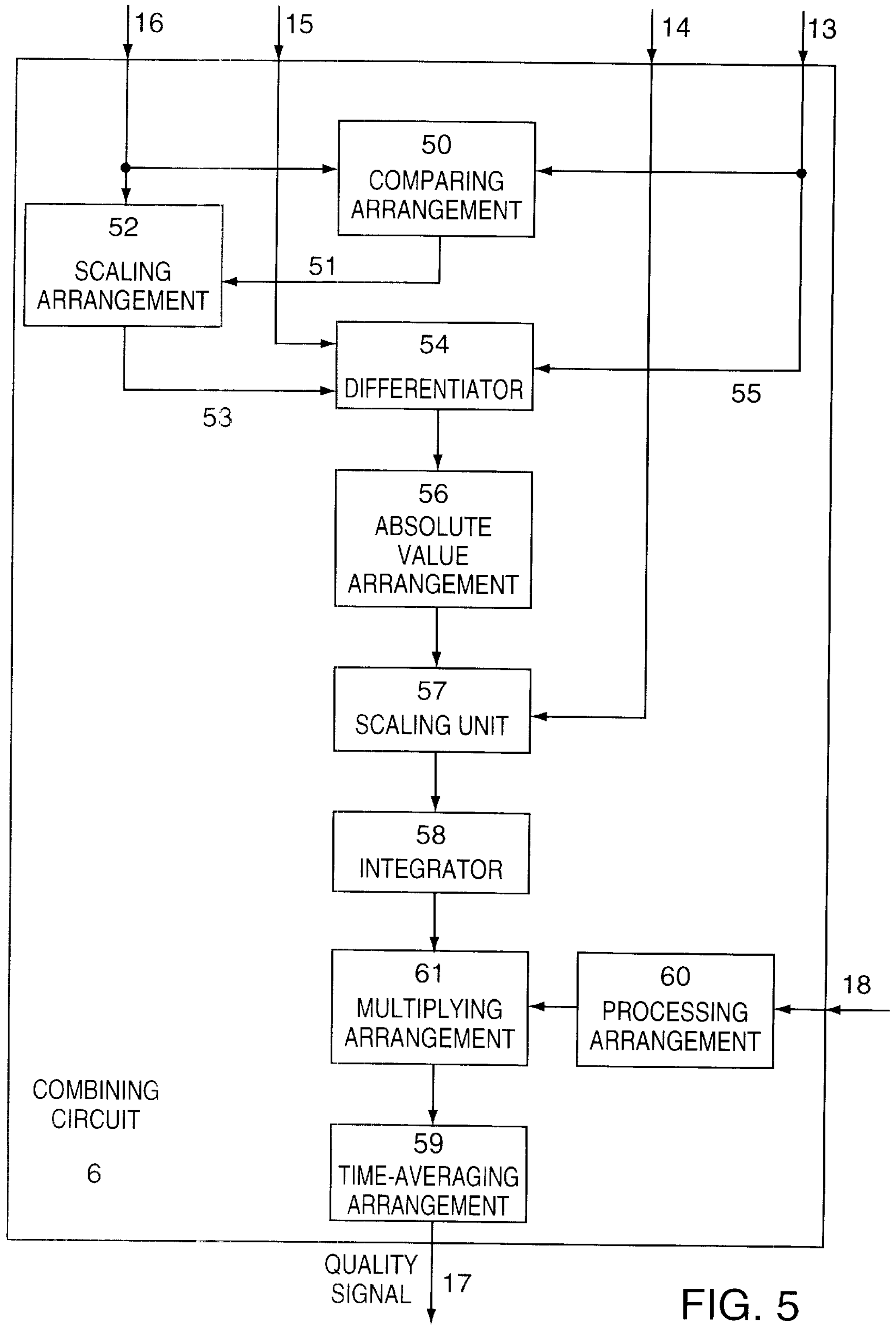
FIG. 5 shows a combining circuit according to the invention for use in the device according to the invention.

The combining circuit 6 shown in FIG. 5 comprises a further comparing arrangement 50, a first input of which is connected to the first input of combining circuit 6 for receiving the first compressed signal parameter via coupling 13 and a second input of which is connected to the second input of combining circuit 6 for receiving the second compressed signal parameter via coupling 16. The first input of combining circuit 6 is furthermore connected to a first input of a differential arrangement 54,56. An output of further comparing arrangement 50 for generating a further scaling signal is connected via a coupling 51 to a control input of scaling arrangement 52, an input of which is connected to the second input of combining circuit 6 for receiving the second compressed signal parameter via coupling 16 and an output of which is connected via a coupling 53 to a second input of differential arrangement 54,56 for determining a differential signal on the basis of the mutually scaled compressed signal parameters. A third input of the differential arrangement 54,56 is connected to the fourth input of the combining circuit 6 for receiving, via coupling 15, the second compressed signal parameter to be received via coupling 16. Differential arrangement 54,56 comprises a differentiator 54 for generating a differential signal and a further absolute-value arrangement 56 for determining the absolute value of the differential signal, an output of which is connected to an input of a further scaling unit 57, a control input of which is connected to the third input of combining circuit 6 for receiving the scaling signal via coupling 14. An output of further scaling unit 57 is connected to an input of an integrating arrangement 58,59 for integrating the scaled absolute value of the differential signal with respect to time and frequency. Combining circuit 6 is further provided with a discounting arrangement 60,61, which comprises a processing 60 and a multiplying arrangement 61. An input of processing arrangement 60 is coupled via the fifth input of the combining circuit 6 to coupling 18 for receiving the comparison signal, and an output of the processing arrangement 60 is coupled to a first input of the multiplying arrangement 61. Integrating arrangement 58,59 comprises a series arrangement of an integrator 58 and a time-averaging arrangement 59, an output of which is connected to the output 17 of combining circuit 6 for generating the quality signal. An output of the integrator 58 is coupled to a second input of the multiplying arrangement 61, of which an output is coupled to an input of the time-averaging arrangement 59.

The operation of a known device for determining the quality of the output signal to be generated by the signal processing circuit such as, for example, the coder/decoder, or codec, which known device is formed without the discounting arrangement 60,61 shown in greater detail in FIG. 5, is as follows and, indeed, as also described in the referenced international patent applications.

The output signal of the signal processing circuit such as, for example, the coder/decoder, or codec, is fed to input 7, after which the first signal processing circuit 1 converts said output signal into a first signal parameter represented by means of a time spectrum and a Bark spectrum. This takes place by means of the first multiplier 20 which multiplies the output signal represented by means of a time spectrum by a window function represented by means of a time spectrum, after which the signal thus obtained and represented by means of a time spectrum is transformed by means of first transformer 21 to the frequency domain, for example by means of an FFT, or fast Fourier transform, after which the absolute value of the signal thus obtained and represented by means of a time spectrum and a frequency spectrum is determined by means of the first absolute-value arrangement 22, for example by squaring, after which the signal parameter thus obtained and represented by means of a time spectrum and a frequency spectrum is converted by means of first converter 23 into a signal parameter represented by means of a time spectrum and a Bark spectrum, for example by resampling on the basis of a nonlinear frequency scale, also referred to as Bark scale, which signal parameter is then adjusted by means of first discounter 24 to a hearing function, or is filtered, for example by multiplying by a characteristic represented by means of a Bark spectrum.

In a corresponding manner, the input signal of the signal processing circuit such as, for example, the coder/decoder, or codec, is fed to input 8, after which the second signal processing circuit 2 converts said input signal into a second signal parameter represented by means of a time spectrum and a Bark spectrum.

The first series circuit signal (the first signal parameter represented by means of a time spectrum and a Bark spectrum) to be received via coupling 9 and the first input of scaling circuit 3 is fed to the first input of further integrating arrangement 40 and the second series circuit signal (the second signal parameter represented by means of a time spectrum and a Bark spectrum) to be received via the coupling 10 and the second input of scaling circuit 3 is fed to the second input of further integrating arrangement 40, which integrates the two series circuit signals with respect to frequency, after which the integrated first series circuit signal is fed via the first output of further integrating arrangement 40 to the first input of comparing arrangement 41 and the integrated second series circuit signal is fed via the second output of further integrating arrangement 40 to the second input of comparing arrangement 41. The latter compares the two integrated series circuit signals and generates, in response thereto, the comparison signal which is fed to the control input of scaling unit 42. The latter scales the first series circuit signal (the first signal parameter represented by means of a time spectrum and a Bark spectrum) to be received via coupling 9 and the first input of scaling circuit 3 as a function of said comparison signal (that is to say increases or reduces the amplitude of said first series circuit signal) and generates the thus scaled first series circuit signal via the output of scaling unit 42 to the first output of scaling circuit 3, while the second input of scaling circuit 3 is connected through in this example in a direct manner to the second output of scaling circuit 3. In this example, the scaled first series circuit signal and the second series circuit signal, respectively are passed via scaling circuit 3 to first compressing arrangement 4 and second compressing arrangement 5, respectively.

The scaled first signal parameter thus obtained and represented by means of a time spectrum and a Bark spectrum is then converted by means of the first compressing arrangement 4 into a first compressed signal parameter represented by means of a time spectrum and a Bark spectrum. This takes place by means of first adder 30, third multiplier 32 and first delay arrangement 34, the signal parameter represented by means of a time spectrum and a Bark spectrum being multiplied by a feed signal represented by means of a Bark spectrum such as, for example, an exponentially decreasing signal, after which the signal parameter thus obtained and represented by means of a time spectrum and a Bark spectrum is added, with a delay in time, to the signal parameter represented by means of a time spectrum and a Bark spectrum, after which the signal parameter thus obtained and represented by means of a time spectrum and a Bark spectrum is convoluted by means of first nonlinear convoluting arrangement 36 with a spreading function represented by means of a Bark spectrum, after which the signal parameter thus obtained and represented by means of a time spectrum and a Bark spectrum is compressed by means of first compressing unit 37.

In a corresponding manner, the second signal parameter represented by means of a time spectrum and a Bark spectrum is converted by means of the second compressing arrangement 5 into a second compressed signal parameter represented by means of a time spectrum and a Bark spectrum.

The first and second compressed signal parameters, respectively, are then fed via the respective couplings 13 and 16 to combining circuit 6, it being assumed for the time being that this is a standard combining circuit which lacks the discounting arrangement 60,61 shown in greater detail in FIG. 5. The two compressed signal parameters are integrated by further comparing arrangement 50 and mutually compared, after which further comparing arrangement 50 generates the further scaling signal which represents, for example, the average ratio between the two compressed signal parameters. Said further scaling signal is fed to scaling arrangement 52 which, in response thereto, scales the second compressed signal parameter (that is to say, increases or reduces it as a function of the scaling signal). Obviously, scaling arrangement 52 could also be used, in a manner known to the person skilled in the art, for scaling the first compressed signal parameter instead of for scaling the second compressed signal parameter and use could furthermore be made, in a manner known to the person skilled in the art, of two scaling arrangements for mutually scaling the two compressed signal parameters at the same time. The differential signal is derived by means of differentiator 54 from the mutually scaled compressed signal parameters, the absolute value of which differential signal is then determined by means of further absolute-value arrangement 56. The signal thus obtained is integrated by means of integrator 58 with respect to a Bark spectrum and is integrated by means of time-averaging arrangement 59 with respect to a time spectrum and generated by means of output 17 as quality signal which indicates in an objective manner the quality of the signal processing circuit such as, for example, the coder/decoder or codec.

As a result of using the scaling circuit 3, usually a good correlation is obtained between the objective quality signal to be assessed by means of the device according to the invention and a subjective quality signal to be assessed by human observers. This all is based, inter alia, on the insight that the poor correlation between objective quality signals to be assessed by means of known devices and subjective quality signals to be assessed by human observers is the consequence, inter alia, of the fact that certain distortions are found to be more objectionable by human observers than other distortions, which poor correlation is improved by using the two compressing arrangements, and is furthermore based, inter alia, on the insight that, as a result of using scaling circuit 3, the two compressing arrangements 4 and 5 function better with respect to one another, which improves the correlation further.

As a result of the fact that the second input of scaling circuit 3, or coupling 10 or coupling 12, is connected to the second input of ratio-determining arrangement 43 and the output of scaling unit 42, or coupling 11, is connected to the first input of ratio-determining arrangement 43, ratio-determining arrangement 43 is capable of assessing the mutual ratio of the scaled first series circuit signal and the second series circuit signal and of generating a scaling signal as a function thereof by means o the output of ratio-determining arrangement 43, which scaling signal is fed via the third output of scaling circuit 3 and consequently via coupling 14 to the third input of combining circuit 6. Said scaling signal is fed in combining circuit 6 to further scaling unit 57 which scales, as a function of said scaling signal, the absolute value of the differential signal originating from the differential arrangement 54,56 (that is to say increases or reduces the amplitude of said absolute value). As a consequence thereof, the already improved correlation is improved further as a result of the fact an (amplitude) difference still present between the scaled first series circuit signal and the second series circuit signal in the combining circuit is discounted and integrating arrangement 58,59 functions better as a result.

A further improvement of the correlation is obtained if differentiator 54 (or further absolute-value arrangement 56) is provided with a further adjusting arrangement, not shown in the figures, for example in the form of a subtracting circuit which somewhat reduces the amplitude of the differential signal. Preferably, the amplitude of the differential signal is reduced as a function of a series circuit signal, just as in this example it is reduced as a function of the compressed second signal parameter originating from second compressing arrangement 5, as a result of which integrating arrangement 58,59 functions still better. As a result, the already very good correlation is improved still further.

However, in case the signal processing circuit comprises for example a radio link, the objective quality signal to be assessed by means of said device and a subjective quality signal to be assessed by human observers could have a poor correlation. This problem is consequently solved by the device according to the invention, which device is provided with the discounting arrangement 60,61.

The operation of the device according to the invention for determining the quality of the output signal to be generated by the signal processing circuit such as, for example, the coder/decoder, or codec, is as described above, supplemented by what follows.

The processing arrangement 60 receives the comparison signal from the comparing arrangement 41 via coupling 18, which comparison signal is processed, for example by raising this comparison signal to the power p, where $0<p<1$. Possible values for p could be, for example $p=0.2$ or $p=0.3$ or $p=0.4$ or $p=0.5$. By the multiplying arrangement 61 the processed comparison signal is then multiplied with the integrated signal (integrated with respect to a Bark spectrum), and the resulting signal is then integrated by means of time-averaging arrangement 59 with respect to a time spectrum and generated by means of output 17 as quality signal which indicates in an objective manner the quality of the signal processing circuit.

As a result of providing the device with the discounting arrangement 60,61, in particular large amplitude differences present between both series circuit signals can be discounted at the integrating arrangement 58,59. Due to said discounting, a good correlation is obtained between the objective quality signal to be assessed by means of said device and a subjective quality signal to be assessed by human observers, even when the signal of which the quality has to be determined is transported via a radio link.

The invention is based, inter alia, on the insight that the poor correlation between objective quality signals to be assessed by means of known devices and subjective quality signals to be assessed by human observers could also be the consequence, inter alia, of the fact that in particular large amplitude differences present between both series circuit signals imply a bad quality.

It should be noted that the use of the discounting arrangement 60,61 will also improve the correlation in case the signal processing circuit comprises an ATM link and in case the signal processing circuit generates signals which differs a lot from signals originating from the reference signal.

The components shown in FIG. 2 of first signal processing arrangement 1 are described, as stated earlier, adequately and in a manner known to the person skilled in the art in the references. A digital output signal which originates from the signal processing circuit such as, for example, the coder/decoder, or codec, and which is, for example, discrete both in time and in amplitude is multiplied by means of first multiplier 20 by a window function such as, for example, a so-called cosine square function represented by means of a time spectrum, after which the signal thus obtained and represented by means of a time spectrum is transformed by means of first transformer 21 to the frequency domain, for example by an FFT, or fast Fourier transform, after which the absolute value of the signal thus obtained and represented by means of a time spectrum and a frequency spectrum is determined by means of the first absolute-value arrangement 22, for example by squaring. Finally, a power density function per time/frequency unit is thus obtained. An alternative way of obtaining said signal is to use a subband filtering arrangement for filtering the digital output signal, which subband filtering arrangement generates, after determining an absolute value, a signal parameter as a function of time and frequency in the form of the power density function per time/frequency unit. First converter 23 converts said power density function per time/frequency unit, for example by resampling on the basis of a nonlinear frequency scale, also referred to as Bark scale, into a power density function per time/Bark unit, which conversion is described comprehensively in Appendix A of the Beerends et al paper, and first discounter 24 multiplies said power density function per time/Bark unit, for example by a characteristic, represented by means of a Bark spectrum, for performing an adjustment on a hearing function.

The components, shown in FIG. 3, of first compressing arrangement 4 are, as stated earlier, described adequately and in a manner knowing to the person skilled in the art in the Beerends et al paper. The power density function per time/Bark unit adjusted to a hearing function is multiplied by means of multiplier 32 by an exponentially decreasing signal such as, for example, $\exp\{-T/\tau(z)\}$. Here T is equal to 50% of the length of the window function and consequently represents half of a certain time interval, after which certain time interval first multiplier 20 always multiplies the output signal by a window function represented by means of a time spectrum (for example, 50% of 40 msec is 20 msec). In this expression, $\tau(z)$ is a characteristic which is represented by means of the Bark spectrum and is shown in detail in FIG. 6 of the International patent application WO 96/28953. First delay arrangement 34 delays the product of this multiplication by a delay time of length T, or half of the certain time interval. First nonlinear convolution arrangement 36 convolves the signal supplied by a spreading function represented by means of a Bark spectrum, or spreads a power density function represented per time/Bark unit along a Bark scale, which is described comprehensively in Appendix B of the Beerends et al paper. First compressing unit 37 compresses the signal supplied in the form of a power density function represented per time/Bark unit with a function which, for example, raises the power density function represented per time/Bark unit to the power $\alpha$, where $0<\alpha<1$.

The components, shown in FIG. 4, of scaling circuit 3 can be formed in a manner known to the person skilled in the art. Further integrating arrangement 40 comprises, for example, two separate integrators which separately integrate the two series circuit signals supplied by means of a Bark spectrum, after which comparing arrangement 41 in the form of, for example, a divider, divides the two integrated signals by one another and feeds the division result or the inverse division result as control signal to scaling unit 42 which, in the form of, for example, a multiplier or a divider, multiplies or divides the second series circuit signal by the division result or the inverse division result in order to make the two series circuit signals, viewed on average, of equal size. Ratio-determining arrangement 43 receives the first and the scaled second series circuit signal in the form of compressed, spread power density functions represented per time/Bark unit and divides them by one another to generate the scaling signal in the form of the division result represented per time/Bark unit or the inverse thereof, depending on whether further scaling unit 57 is constructed as multiplier or as divider.

The components, shown in FIG. 5, of first combining circuit 6 are, as stated earlier, described adequately and in a manner known to the person skilled in the art in the fourth reference, with the exception of the component 57 and a portion of component 54. Further comparing arrangement 50 comprises, for example, two separate integrators which separately integrate the two series circuit signals supplied over, for example, three separate portions of a Bark spectrum and comprises, for example, a divider which divides the two integrated signals by one another per portion of the Bark spectrum and feeds the division result or the inverse division result as scaling signal to scaling arrangement 52 which, in the form of, for example, a multiplier or a divider, multiplies or divides the respective series circuit signal by the division result or the inverse division result in order to make the two series circuit signals, viewed on average, of equal size per portion of the Bark spectrum. All this is described comprehensively in Appendix F of the Beerends et al paper. Differentiator 54 determines the difference between the two mutually scaled series circuit signals. If the difference is negative, said difference can then be augmented by a constant value and, if the difference is positive, said difference can be reduced by a constant value, for example by detecting whether that difference is less or greater than the value zero and then adding or subtracting the constant value. It is, however, also possible first to determine the absolute value of the difference by means of further absolute-value arrangement 56 and then to deduct the constant value from said absolute value, in which case a negative final result must obviously not be permitted to be obtained. In this last case, absolute-value arrangement 56 should be provided with a subtracting circuit. Furthermore, it is possible, to discount from the difference a (portion of a) series circuit signal in a similar manner instead of the constant value or together with the constant value. Integrator 58 integrates the signal originating from further scaling unit 57 with respect to a Bark spectrum and time-averaging arrangement 59 integrates the signal thus obtained with respect to a time spectrum, as a result of which the quality signal is obtained which has a value which is the smaller, the higher the quality of the signal processing circuit is.

The widest meaning should be reserved for the term signal processing circuit, in which connection, for example, all kinds of audio and/or video equipment can be considered. Thus, the signal processing circuit could be a codec, in which case the input signal is the reference signal with respect to which the quality of the output signal should be determined. The signal processing circuit could also be an equalizer, in which connection the quality of the output signal should be determined with respect to a reference signal which is calculated on the basis of an already existing virtually ideal equalizer or is simply calculated. The signal processing circuit could even be a loudspeaker, in which case a smooth output signal could be used as reference signal, with respect to which the quality of a sound output signal is then determined (scaling already takes place automatically in the device according to the invention). The signal processing circuit could furthermore be a loudspeaker computer model which is used to design loudspeakers on the basis of values to be set in the loudspeaker computer model, in which connection a low-volume output signal of said loudspeaker computer model serves as the reference signal and in which connection a high-volume output signal of said loudspeaker computer model then serves as the output signal of the signal processing circuit.

In the case of a calculated reference signal, the second signal processing arrangement of the second series circuit could be omitted as a result of the fact that the operations to be performed by the second signal processing arrangement can be discounted in calculating the reference signal.

What is claimed is:

1. A device for determining quality of an output signal, to be generated by a signal processing circuit, with respect to a reference signal, the device comprising:

a first series circuit having a first input for receiving the output signal, the first series circuit having:

a first signal processing arrangement, coupled to the first input of the first series circuit, for generating a first signal parameter as a function of time and frequency; and a first compressing arrangement, coupled to the first signal processing arrangement, for compressing the first signal parameter so as to generate a first compressed signal parameter;

a second series circuit having a second input for receiving the reference signal, wherein the second series circuit has a second compressing arrangement, coupled to the second input, for generating a second compressed signal parameter;

a combining circuit, coupled to a first output of the first series circuit and to a second output of the second series circuit, for generating a quality signal, the combining circuit having:

a differential arrangement, coupled to the first and second compressing arrangements, for determining a differential signal in response to the first and second compressed signal parameters;

a first integrating arrangement, coupled to the differential arrangement, for integrating the differential signal with respect to frequency so as to yield an integrated differential signal; and a time-averaging arrangement for generating the quality signal by integrating a multiplied integrated differential signal with respect to time;

a scaling circuit, situated between inputs of the first and second compressing arrangements, having:

a second integrating arrangement for integrating a first series circuit signal and a second series circuit signal produced by said first and second series circuits, respectively, with respect to frequency so as to yield first and second integrated series circuit signals; and a comparing and scaling arrangement, coupled to the second integrating arrangement, for comparing the first and second integrated series circuit signals so as to generate a comparison signal and, in response thereto, scaling at least one of the first and second series circuit signals;

a processing arrangement for processing the comparison signal originating from the comparing and scaling arrangement so as to yield a processed comparison signal; and a multiplying arrangement for generating the multiplied integrated differential signal as a function of the processed comparison signal and the integrated differential signal, the multiplying arrangement comprising:

a first input coupled to an output of the processing arrangement;

a second input coupled to an output of the first integrating arrangement so as to receive the integrated differential signal; and an output coupled to an input of the time-averaging arrangement.

2. The device recited in claim 1 wherein the scaling circuit comprises a scaling unit having:

an input coupled to an output of the first signal processing arrangement;

an output coupled to an input of the first compressing arrangement; and a control input coupled to an output of the comparing arrangement for scaling the first series circuit signal in response to the comparison signal.

3. The device recited in claim 1 wherein the processing arrangement raises the comparison signal to a power p, where $0<p<1$, so as to yield the processed comparison signal.

4. The device according to claim 1 wherein the second series circuit further comprises a second signal processing arrangement, coupled to the second input, for generating a second signal parameter as a function of both time and frequency, the second compressing arrangement being coupled to the second signal processing arrangement in order to compress the second signal parameter in order to generate the second compressed signal parameter.

5. A method for determining quality of an output signal, to be generated by a signal processing circuit, with respect to a reference signal, the method comprising the steps of:

generating a first signal parameter as a function of time and frequency in response to the output signal;

integrating, with respect to frequency, the first signal parameter and a second signal parameter so as to yield first and second integrated signal parameters;

comparing the integrated first and second signal parameters so as to yield a comparison signal;

scaling at least one of the first and second signal parameters in response to the comparison signal;

compressing the first signal parameter and the second signal parameter so as to yield first and second compressed signal parameters;

determining a differential signal in response to the first and second compressed signal parameters;

generating a quality signal by integrating the differential signal in a first sub-step with respect to frequency so as to yield an integrated differential signal and then integrating a resulting signal in a second sub-step with respect to time;

processing the comparison signal so as to yield a processed comparison signal; and multiplying the integrated differential signal with the processed comparison signal so as to yield the resulting signal.

6. The method according to claim 5 further comprising the step of scaling the first signal parameter in response to the comparison signal.

7. The method according to claim 5 wherein the comparison signal processing step comprises the step of raising the comparison signal to a power p, where $0<p<1$, so as to yield the processed comparison signal.

8. The method according to claim 5 further comprising the step of generating the second signal parameter as a function of both time and frequency in response to the reference signal.

* * * * *